Jan. 17, 1961  R. L. BERSIN ET AL  2,968,726
RADIATION MEASURING INSTRUMENT
Filed Dec. 27, 1955  3 Sheets-Sheet 1
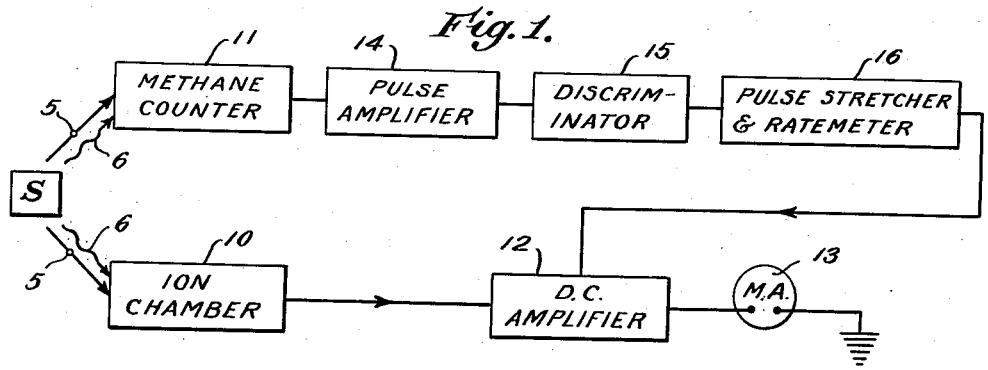
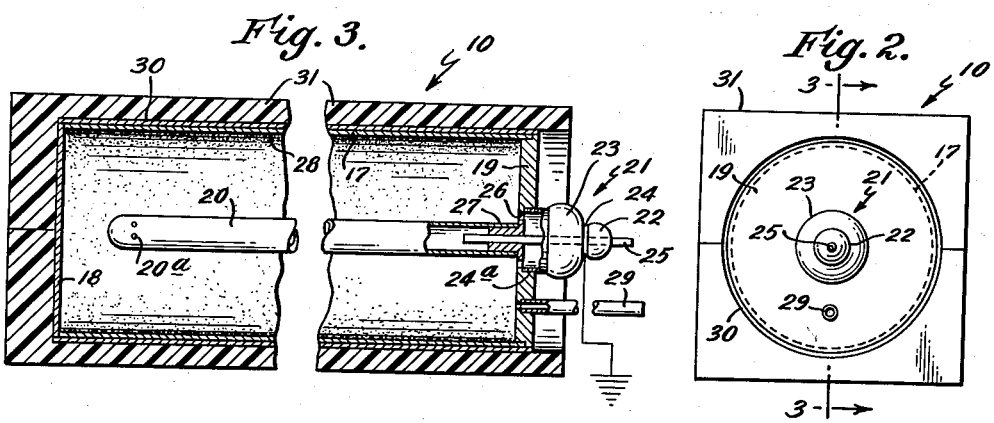
Inventors:
Richard L. Bersin,
Joris M. Brinkerhoff,
by Spencer E. Olsen
Atty.

Jan. 17, 1961 R. L. BERSIN ET AL 2,968,726
RADIATION MEASURING INSTRUMENT
Filed Dec. 27, 1955 3 Sheets-Sheet 3
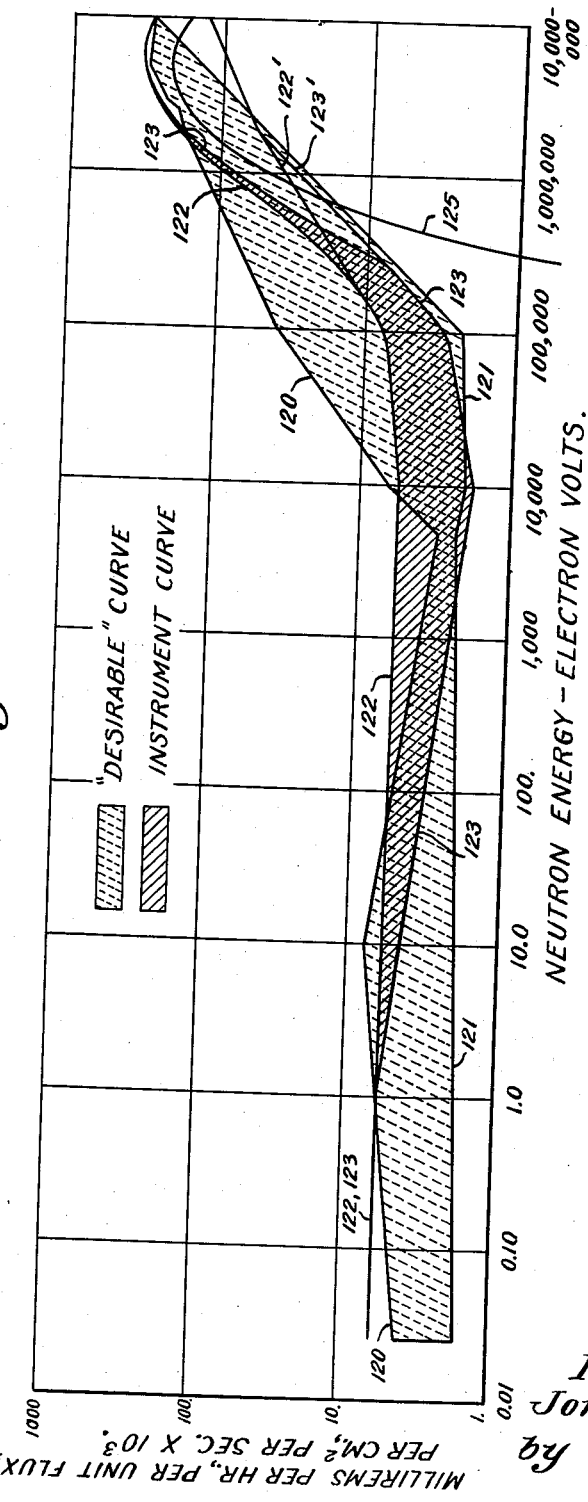
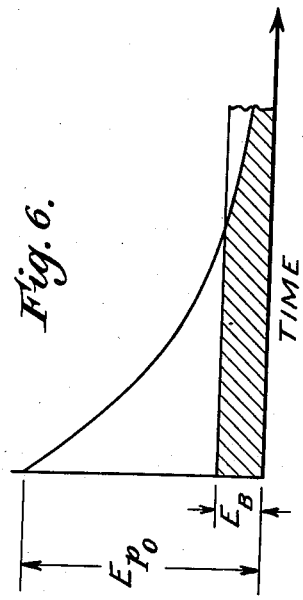
Inventors:
Richard L. Bersin,
Joris M. Brinkerhoff,
by Spencer E. Olin
Atty.

United States Patent Office 2,968,726
Patented Jan. 17, 1961

2,968,726
RADIATION MEASURING INSTRUMENT

Richard L. Bersin, East Braintree, and Joris M. Brinkerhoff, Arlington, Mass., assignors to Tracerlab, Inc., Boston, Mass., a corporation of Massachusetts Filed Dec. 27, 1955, Ser. No. 555,603

17 Claims. (Cl. 250—83.1)

This invention relates to apparatus for measuring radioactivity, and more particularly to a detection system which responds in a biologically equivalent manner to a mixed radiation field composed of slow neutrons, fast neutrons and/or gamma radiation.

In connection with work having to do with radioactive material, it is highly important to provide proper protection for the personnel who are exposed to the radiation therefrom. In the case of personnel working in the vicinity of a nuclear reactor, for example, they may be subjected to neutrons having a wide range of energies, from thermal or slow neutrons up to 10 mev. and more, and also to gamma radiation, since ordinarily gamma radiation is present wherever neutrons are being released, both of which have destructive effects on human tissue. While the biological effect of these radiations as a function of their energy is being constantly studied, the available information is still somewhat tentative; it is generally accepted, however, that there is a maximum permissible amount of exposure to these types of radiation to which individuals may safely be subjected in any period of time, while exposure in excess of that amount is dangerous. It is important, therefore, both to prevent overexposure if possible and also to know promptly if it has inadvertently occurred in order that immediate attention may be given to corrective treatment.

It is generally accepted that the biological damage caused by an ionizing particle's dissipation of energy within the body varies in proportion to the density of ionization along the particle's path. That is, a 1 mev. electron dissipating its energy within the body over its range of 1 mm. will do less biological harm than a 1 mev. proton which dissipates its energy over a range of .02 mm. Thus, for equal energy dissipation within the body, the damage depends upon the form of radiation. An energy dissipation of 83 ergs per gram of exposed tissue constitutes a dose to that tissue of one r.e.p. (roentgen-equivalent-physical). If this radiation be solely X- or gamma-radiation, of any energy, according to present criteria, it is said that this tissue has experienced a biological dose of one r.e.m. (roentgen-equivalent-man). The energy absorption in the human body from X-rays and gamma rays comes about through the ionization caused by secondary electrons produced by these radiations. If, then, some other form of radiation, e.g., neutrons, produced secondary ionizing particles whose ionization was denser than that from electrons, a dose of 1 r.e.p. of that radiation would produce a biological dose in excess of 1 r.e.m. The ratio between the r.e.m. dose produced by any radiation to that produced by an equal r.e.p. dose of gamma rays is called the relative biological effectiveness (RBE) of that radiation. It is common practice in dosimetry to consider the RBE of all gamma radiations, regardless of their energies, as unity, but actually equal roentgen (air) doses of hard and soft gamma rays will produce different tissue doses because the penetration into the body depends upon the energy.

So, too, with neutrons, the tissue dose is very much dependent on the energy of the neutrons. The neutron reactions which have been considered by the medical profession as having biological significance, and which monitoring equipment should be adapted to measure, are the following:

Neutron energy:                Principal reactions
.025 ev.$<E_n<10^4$ ev____ $1_H{}^1$ $(n, \gamma)$, $7_N{}^{14}$ $(n, p)$.
$10^4$ ev.$<E_n<10^7$ ev____ $1_H{}^1$ $(n, \gamma)$, $7_N{}^{14}$ $(n, p)$, $1_H{}^1$ $(n, p)$.
$E_n>10^7$ ev_____ $1_H{}^1$ $8_O{}^{16}$, $7_N{}^{14}$, etc.; recoils.

From this table it is seen that for slow neutrons the principal reaction with tissue are a gamma-ray production and a proton production, while at higher energies (fast neutrons), proton recoils are produced. Since the densities of ionization of the resultant ionizing particles are in general quite different, the net RBE factor for neutrons varies over the energy spectrum. It has recently been announced by the National Bureau of Standards (Handbook No. 59, issued September 24, 1954) that the higher values of RBE generally associated with ionizing particles of high specific ionization (as produced by neutron reactions) are actually manifested only in very limited regions of the body where the "critical organs" lie; i.e., lens of eye-depth=3 mm. from front; bloodforming organs-depth 5 cm. from all directions; and gonads-depth 1 cm., varying with conditions but taken as 5 cm. for calculations. When the whole body is exposed to radiation, only that radiation reaching these critical areas manifests the high values of RBE.

Heretofore, no satisfactory instrument has been available which was capable of measuring and directly indicating the body dosage caused by a mixed radiation field of neutrons and gamma radiation; indeed, none is available for measuring either of these types of radiation separately and indicating the dosage rate is r.e.m. units. Normal practice has been to separately measure the gamma radiation present in a mixed flux and indicate the dose in terms of r.e.p.'s, and to separately measure the neutron dose in terms of r.e.p.'s. Measurement of the hazard to personnel from neutrons has followed either of two basic philosophies. The first, an analytical one, consists of making measurements of the physical properties of the neutron field, such as flux energy distribution, and then analytically correlating this information with biological dosage data. In this system the dosage rate of the radiation field is of necessity determined some period of time after the actual exposure, the length of this period being determined by the complexity of the measurements and the analytical interpretation following. Photographic film has been used in this method, the procedure being tedious and the accuracy poor at low dosage rates.

The other basic method consists of using several instruments, each of which is designed to measure the dosage attributable to a different portion of the neutron spectrum. These instruments may be of the form disclosed in Pat. No. 2,638,553 for the measurement of slow neutrons, or of the type described in The Review of Scientific Instruments, vol. 22, No. 12, pp. 981-986 (December 1951) for the measurement of fast neutrons, and are usually read in reps. These instruments, however, cover broad bands of energy, so that interposing a constant RBE factor for the response of the various instruments results in only qualitative indication of the biological hazard of the neutron field.

With an appreciation of the foregoing deficiencies of prior art systems for measuring radiation dosage, applicants have as a primary object of the present invention to provide an instrument which will give a direct visual indication of the exposure to a radiation field, calibrated in r.e.m.'s.

Another object of the present invention is to provide an instrument which will respond in a biologically equivalent manner to a radiation field composed of neutrons and/or gamma- and/or X-radiation.

Another object of the invention is to provide an instrument which will respond in a biologically equivalent manner to a radiation field composed of neutrons of all energies up to about 10 mev. and/or gamma and X-radiation.

Another object of the invention is to provide an instrument which will take into account the fact that the higher values of RBE associated with high energy neutrons are manifested only in limited regions of the body.

Still another object of the invention is to provide an instrument having a built-in RBE factor which varies properly over the energy spectrum up to about 10 mev.

Another object of the invention is to provide an instrument possessing the foregoing characteristics that is light in weight and relatively strong and rugged in construction and operation, making it possible for the user to carry it into areas where a radiation hazard is suspected.

In the attainment of the foregoing objects, the instrument in accordance with the invention basically comprises two measuring systems, one being designed to have a response to neutron and gamma radiation comparable to the biological dose experienced by the critical regions within the body, and the other being designed to have a response to fast neutron radiation comparable to the biological dose experienced by the critical regions at the surface of the body. The responses of the two systems are combined in such a way that the overall system responds as the r.e.m. dose produced in that region of the body in which the maximum dose occurs for a given neutron energy. Stated another way, one of the systems is analogous to the mid-section of the body in its response to radiation, and the other system is analogous to the eyes in its response to radiation, especially to fast neutron radiation in that it has a high RBE factor. Thus, by suitable combination of the two systems, the composite instrument will indicate the dose in either of these regions, depending upon which happens to be higher, thus giving an indication of the maximum biological damage being done anywhere in the body by the particular radiation field being measured.

To simulate the midsection of the body in its response to radiation a specially designed ionization chamber, adapted to respond to gamma radiation and neutrons up to a predetermined energy, is used. Basically, the chamber comprises a steel shell of predetermined wall thickness containing hydrogen gas at high pressure. The inner wall of the shell is coated with boron or other thermal neutron-sensitive material, and the entire chamber is surrounded with a moderating material of sufficient thickness to produce thermalization of all neutrons up to a predetermined energy. The steel wall and hydrogenous gas fill make the chamber sensitive to gamma radiation, and the boron wall coating renders it sensitive to thermal neutrons. The moderator surrounding the chamber is analogous to the moderating material surrounding the midsection of the body, the neutrons thermalized thereby also being detected by virtue of the boron coating. At higher neutron energies, the number of un-thermalized neutrons reaching the hydrogenous gas in the ion chamber increases and the chamber responds thereto by reason of first collisions in the hydrogen gas. The chamber, without moderator, is so designed that at neutron energies where the body response arises primarily from first collisions, the ion chamber exhibits an RBE factor of about 5.

Based on presently available biological data, at the higher neutron energies, proton recoils contribute significantly to biological damage, especially to the eyes, and the response of the chamber described above is too low to give a safe measure of dosage. To introduce a correction for this deficiency in the ion chamber, a methane counter is added to the system to obtain a signal proportional to the added biological effect of high enery neutrons. The pulsed output of the methane counter is integrated and the resulting current added to the output of the ionization chamber to obtain an increased response from the instrument over the region of the energy spectrum where the RBE factor of the chamber alone is low. By proper selection of design parameters for the ion chamber, methane counter, and associated circuitry, the composite instrument responds in essentially the same manner as the body to neutron and gamma radiation and yields an indication readable in r.e.m. units.

Other objects, features and advantages of the invention will become apparent from understanding of the invention will become apparent from the following detailed description when considered with the accompanying drawings in which:

Fig. 1 is a block diagram of the instrument, the ion chamber and counter being shown in schematic form;

Fig. 2 is an end view of the ion chamber constructed in accordance with the invention;

Fig. 3 is an elevation cross-section of the ion chamber taken along section line 3—3 of Fig. 2;

Fig. 4 is an elevation cross-section of the methane counter constructed in accordance with the invention;

Fig. 4a is a fragmentary sectional view taken along section line 4a—4a of Fig. 4;

Fig. 6 is a sketch useful in explaining the operation of a portion of the circuit of Fig. 5; and Fig. 7 is a graph showing a comparison of the response of the instrument to a hypothetical "desirable" curve, the latter representing the application of most recent biological experimental results to the field of neutron health hazard evaluation.

Figure 5:
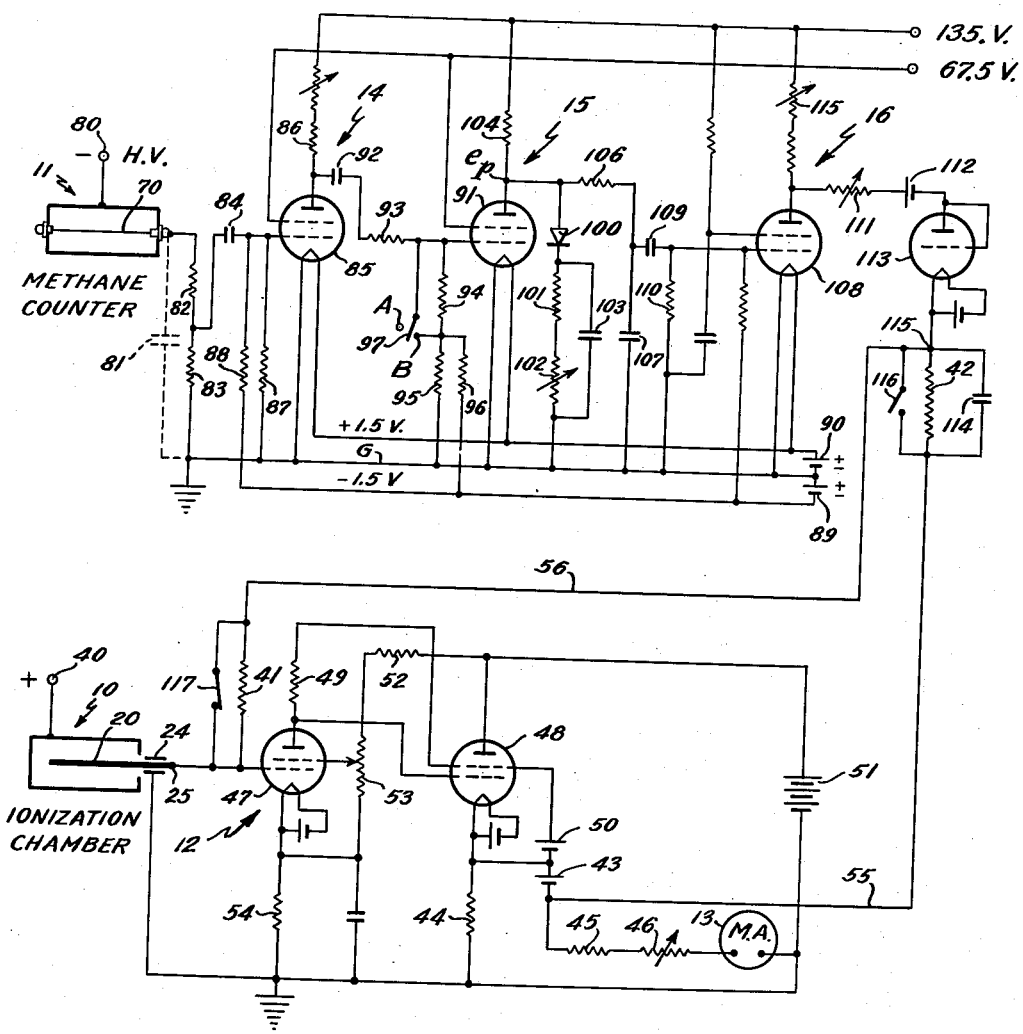
Fig. 5 is a simplified circuit diagram of the instrument.

Referring to the drawings, and more particularly to Fig. 1, the instrument is shown in block diagram form and illustrates the two-channel character of the system. The block designated S represents a radiation source from which may emanate neutrons 5 having energies from thermal up to 10 mev. and/or gamma radiation 6. It is the function of the present instrument to read directly in rems the effects on the human body of the radiation from the source. Two detectors are used in the instrument, an ionization chamber 10, and a proportional counter 11, the details of which will be described in connection with Figs. 2, 3, and 4. Ionization chamber 10 is designed to be biologically equivalent (r.e.m. reading) for low and medium energy neutrons and for gamma rays, the output of which is applied to a stable direct current amplifier 12 having a meter 13 in its output circuit. Thus, the system comprising chamber 10, amplifier 12 and meter 13 is capable of indicating in r.e.m.'s the effects of low and medium energy neutrons, and gamma rays, on tissue. However, the assignment of a high relative biological effectiveness (RBE) for fast neutrons requires that the instrument response be amplified for high energy neutrons. This is accomplished by combining, in the correct proportions, the output of chamber 10 with the output of counter 11, the latter being biased such that only neutrons above a certain energy will add to the output of the circuit. To this end, the pulse output of proportional counter 11 is amplified in pulse amplifier 14, and then applied to a discriminator 15 which is set to pass only pulses representative of neutrons above a certain energy. The pulses passing the discriminator are then applied to a pule stretching and ratemeter circuit 16 where they are integrated so as to provide an output voltage which varies with the intensity and energy of the incident neutrons. The output of circuit 16 is combined in amplifier 12 with the signal from ion chamber 10, the combined signal being indicated on meter 13. Thus, the indication on meter 13 is in r.e.m.'s, the instrument response being biologically equivalent; that is, having a suitably varying RBE factor with variations in energy of the neutrons, over a range of neutron energies up to about 10 mev.

Referring now to Figs. 2 and 3, the features of ionization chamber 10 which renders it r.e.m. responsive over a predetermined energy range will be described, first in terms of its mechanical construction, and then as to how this construction achieves the desired response. The envelope of the chamber 10 comprises a 1/16-inch thick stainless steel cylinder 17 about 2½ inches in diameter and about nine inches long closed at its ends by plates 18 and 19. The center electrode of the chamber consists of a conducting rod 20 which preferably takes the form of a piece of hollow tubing supported at one end on end plate 19 and insulated therefrom. A convenient structure for this purpose is a Stupakof feed-through connector 21 of a commercially available type formed with two generally cylindrical glass portions 22 and 23 having two circumferential conducting bands 24 and 24a, and having a feed-through tube 25 supported by the glass and insulated from the conducting bands. In the assembly of the chamber, the metallic ring 24a of connector 21 is first soldered into a circular opening 26 in end plate 19, and a cylindrical conducting sleeve 27 having an outer diameter equal to the inside diameter of tube 20 is then soldered to the inner end of feed-through tube 25. Thereafter, the right end of tube 20 is slipped over and soldered to sleeve 27 to complete the assembly. The ends of tube 25 are sealed off, the outer end serving as the external terminal for center electrode 20, and metal band 24 of the connector is connected to ground and serves as a guard ring in accordance with conventional practice.

The inner wall of cylinder 17 is coated with a conducting layer 28 including a material responsive to thermal neutrons, preferably boron. In the preparation of the coating, boric acid $H_3BO_3$ may be mixed with graphite, to make it conducting, and the resultant mixture suspended in alcohol. The suspension is spread over the inside walls of the counter, and upon evaporation of the alcohol and boric acid and carbon adhere to the walls by virtue of their natural adhesive properties. A coating thickness of at least .75 mg./cm.$^2$ is used (this is the maximum range of alpha particles in the coating material), the sensitivity of the coating to thermal neutrons being determined by the percentage of $H_3BO_3$ in the mixture.

After completion of the assembly of chamber 10, it is filled with hydrogen to a pressure of approximately 10 atmospheres through filling tube 29 which is thereafter sealed off. The hollow tube which comprises center electrode 20 has at least one small opening 20a therein to prevent collapse of the tube.

As the chamber 17 contains about 10 atmospheres of hydrogen, it must of necessity be constructed of metal, such as iron or stainless steel. The combination of hydrogen gas and an iron wall create an anomalously high response (as compared to an air wall air-filled chamber) for gamma rays of energies below 500 kev. In order to reduce the response of the chamber of these low energy gamma rays, a high-Z (high atomic number) coating 30 of a material such as lead of a thickness of about 0.03 cm. surrounding cylinder 17 sufficiently cuts down the low energy gamma response, without altering the neutron response, to render the chamber substantially "air equivalent" for gamma rays down to 100 kev. energy.

The assembly of cylinder 17 and lead sheath 30 is surrounded with a neutron moderating material, which may consist of any suitable hydrogenous material. In the present embodiment, a rectangular block of polystyrene 31, having a cylindrical central opening therein for receiving the cylinder 17, is used. The covering of moderating material is not of uniform thickness with this configuration, but the average thermalizing effect of the polystyrene is such as to suitably thermalize incident neutrons below an energy of about 10 kev.

The chamber 10 just described responds to the three basic radiations intended to be monitored; namely, slow neutrons, fast neutrons, and gamma rays. Slow neutrons, after scattering in the moderating material 31, enter the chamber and interact with the nuclei of the boron atoms in the coating 28. When a neutron is absorbed, the boron nucleus becomes unstable and immediately gives off an alpha particle whose energy is about 1.5 mev. and a lithium nucleus of .85 mev. These particles cause ionization of the hydrogen in cylinder 17, the resulting positive ions being drawn to the center electrode 20, which is negative with respect to cylinder 17, and the electrons being drawn to the conducting inner surface of cylinder 17, whereby a current proportional to incident slow neutron flux is manifested at terminal 25.

As mentioned above, the covering of thermalizing material 31 is of sufficient thickness to produce thermalization of all neutrons (not already of thermal energy) up to about 10 kev. The slow neutrons thus produced react similarly with the boron in coating 28 and contribute similarly to the total ionization current, thus producing a flat response curve for neutrons from thermal up to about 10 kev.

The fast neutron ($E>10$ kev.) response of the chamber is derived almost entirely from the hydrogen contained within cylinder 17. The fast neutrons entering the gas experience elastic scattering with the protons of the hydrogen nuclei, the energy given up to the protons causing ionization of the hydrogen and an attendant ionization current at terminal 25. At the fill pressure of about 10 atmospheres the range of any recoil protons to be encountered, from 10 mev. down, is sufficiently small that the wall effects of the chamber may be disregarded.

The gamma radiation response of the chamber is derived from the steel walls 17 of the chamber and the hydrogen fill. The gamma rays pass through the moderating material 31 substantially without change, are shielded to some extent by lead sheath 30, and upon striking steel cylinder 17 interact therewith and eject electrons, some of which emerge from the inner surface of the steel wall and pass through the boron coating 28. These electrons react in the gas fill to produce ionization of the hydrogen, in a manner now well-known, the resulting ionization current contributing to the total current at terminal 25 in an amount proportional to the intensity of the incident gamma radiation.

In summary, then, chamber 10, by virtue of boron coating 28 responds to neutrons of thermal energies, to gamma radiation by virtue of the steel walls of cylinder 17 and the hydrogen fill, and to fast neutrons by virtue of the hydrogen fill. The presence of moderating material 31 around the cylinder 17 produces thermalization of fast neutrons below energies of approximately 10 kev., the resulting slow neutrons being detected by virtue of the boron coating. In the design of the chamber, a suitable compromise is made between the several parameters such that the response to each type of radiation provides a readily measurable ionization current. The total ionization current (which may be due to gamma radiation alone, or slow neutrons alone, or slow and fast neutrons, or a combination of all three) is derived from terminal 25 and measured by suitable circuitry, a preferred embodiment of which will now be described.

Referring to Fig. 5, and especially the lower half thereof, ionization chamber 10, described above, is shown in schematic form, the chamber being energized by application of a positive potential (about 135 volts) to the steel shell 17 (Fig. 2) of the chamber from a source of voltage, represented by terminal 40. The ionization current delivered by chamber 10 flows through resistor 41, of a value of the order of $2 \times 10^{10}$ to $2 \times 10^{12}$ ohms, through resistor 42, and to ground through the parallel paths provided by battery 43 and resistor 44, and resistors 45 and 46 and meter 13. The resistance of resistor 41 is many orders of magnitude larger than the resistance of resistors 42, 44, 45 and 46 and meter 13, with the consequence that the latter resistors do not appreciably affect the signal developed across resistor 41. The signal developed across resistor 41 is applied to amplifier 12, which consists essentially of a voltage amplifier tube 47, (e.g., a CK571AX), and a cathode follower power output tube 48, (e.g., a CK526AX), connected to provide drive for meter 13 and feedback voltage. The circuit is designed to make full use of the principle of inverse feedback, which affords extremely stable operation and a large reduction in time constant. The high gain amplifier 12 is so arranged that its output voltage appears in series opposition to the signal developed across input resistor 41. Thus, with a reasonably high amplifier gain, the output voltage is almost exactly equal to the signal voltage, while the actual grid excursion of tube 47 is small.

Considering the circuit in more detail, the anode of tube 47 is directly connected to the control grid of cathode follower 48, the anode supply voltage for tube 47 being derived from the screen voltage of tube 48 via load resistor 49, the screen voltage of tube 48, in turn, being supplied from battery 50. The anode voltage for tube 48 is supplied by a separate battery 51. As a result of these connections, positive feedback is obtained since the variable anode supply for tube 47 is in phase with the anode itself. Regeneration is limited, however, to values less than infinite, since the energizing voltage can never vary by a greater amount than the anode of tube 47, and hence the system remains stable but with greater gain than would otherwise be possible.

Bias and screen voltages for tube 47 are obtained from a bleeder consisting of resistors 52 and 53 and cathode resistor 54 connected across battery 51, zero adjustment of the amplifier 47 being made by varying the value of its screen voltage by means of potentiometer 53. The cathode of tube 48 is connected to the junction of batteries 43 and 50, which are of equal value, battery 43 being provided to bring the D.C. level of the signal on the cathode of tube 48 to zero. The negative feedback loop of the amplifier is completed by the connection 55 from the negative terminal of battery 43 through resistor 42 (the further significance of which will be explained later) and thence to the base of input resistor 41 via connection 56.

Meter 13, which may be a 0–100 microammeter, is connected in series with resistors 45 and 46 and battery 43 across the load resistor 44 of cathode follower 48, and by virtue of the positive and negative feedback employed, meter 13 faithfully follows the input signal on the control grid of tube 47. As long as the gain of the amplifier is high, changes in gain which might result from battery decay and component aging have very little effect on the accuracy of the indication.

The apparatus thus far described provides a biologically equivalent indication on meter 13 for incident thermal neutrons, gamma radiation and intermediate energy neutrons, but because of the fact that the RBE factor for fast neutrons, especially for the eyes, is higher than the factor of five exhibited by chamber 10, it is necessary to add a correction to the fast neutron response of circuit 12 and meter 13. This correction is derived from the proportional counter 11 of Fig. 1 and its associated circuit, and is combined in amplifier 12 with the signal from chamber 10. Before discussing the manner in which combination is effected to achieve the necessary results, the details of the proportional counter, from which the additional fast neutron response is initially derived, will be described.

Referring to Fig. 4, proportional counter 11 comprises a cylindrical stainless steel shell 60 having a thickness of approximately 65 mils, an outside diameter of 2⅝ inches and a length of about 11½ inches. It will be understood that these dimensions are illustrative only, however, and that some variations are permissible while yielding a suitable response. The cylinder 60 is closed at its ends by metal plates 61 and 62, as by soldering. The cylinder 60 has a low-Z (low atomic number) liner 63 of a material such as aluminum of 94 mils thickness, and the counter volume is divided into four equal-length compartments by three aluminum partitions 64, 65 and 66 disposed transversely of the axis of cylinder 60 as shown, the partitions each being approximately 100 mils thick. Each of partitions 64, 65 and 66 is provided with a central opening in which are respectively cemented tubular insulators 67, 68 and 69. In the disclosed embodiment, the insulators consist of ⅝-inch lengths of Pyrex tubing having an outside diameter of 6 mm. and a wall thickness of 1 mm. The insulators are conveniently secured to the aluminum spacers with Dekhotinsky cement, and are provided to insulate the single center wire 70, which extends the entire length of the counter, from the aluminum partitions. The center wire 70 is of 0.4 mil stainless steel wire and is secured to end plates 61 and 62 by Stupakoff connectors 71 and 72. These connectors are of a commercially available type, being formed primarily of glass and provided with a metallic annular ring 73 which is soldered to the end plates. As can best be seen in Fig. 4a, the center wire 70 is maintained taut by spring 75 secured within each of the connectors, and either of the sealed-off feed-through tubes 74 of the connectors 71 or 72 serves as the external terminal for the center electrode. The chamber is filled with methane through opening 76 to a pressure of approximately 100 cm. Hg, after which the opening is sealed off. A voltage of approximately 2100 volts is impressed between the center wire 70 and the shell 60, with the shell negative, and each time an ionizing event takes place within the counter (caused by a secondary electron in the case of gamma rays and by proton recoils in the case of neutrons) a charge is produced across the counter terminals. This charge momentarily lowers the voltage on the center wire and partially discharges the distributed capacity between the center wire and ground. With suitable circuitry connected to the center wire (to be described in the subsequent further consideration of Fig. 5), this capacity is recharged through a resistor with the formation of a negative pulse.

The lining of the counter with a low-Z material, such as aluminum, is used to reduce the sensitivity of the counter to gamma radiation, and the compartmentization of the counter is utilized to keep the height of pulses produced by gamma radiation small. The counter acts like four separate counters connected in parallel, but the individual compartments are of such dimensions as to make the highest possible energy dissipation in the counter arising from an incident gamma ray equal to about 80 kilovolts. The circuitry which follows the counter is designed to respond only to pulses resulting from energy dissipations in excess of about 250 kilovolts with the consequence that gamma pulses make no contribution to the measured response of the counter, and only pulses arising from incident fast neutrons of energies greater than about 250 kilovolts are indicated. The circuitry for providing this discrimination and providing a sensible indication of the response so as to be combined with the output of the ionization chamber 10 will now be described.

Referring again to Fig. 5, the counter 11, just described in detail, is energized from a source of high voltage, represented by terminal 80, connected to the outer conducting shell. For the counter parameters described, the source is preferably of a value of approximately 2100 volts and of negative polarity. When an ionizing event takes place in counter 11 due to incident gamma or fast neutron radiation, it produces a charge across the counter terminals. This charge momentarily lowers the voltage on the center wire 70 and partially discharges the distributed capacity 81 between the center wire and ground. This capacity is then recharged through resistor 82 and resistors 83, 87 and 88. A negative pulse is, therefore, formed and the fraction thereof developed across resistor 83 is applied through blocking condenser 84 to the grid of tube 85 of pulse amplifier 14. Tube 85 is energized from a suitable source of B+ voltage, such as a battery pack in a portable instrument, part of the plate resistor 86 being variable to control the gain of the stage. The cathode of the tube is connected to ground, and resistors 87 and 88 connected from the control grid to ground and to a source of bias voltage, respectively, form a divider for the grid bias voltage. Bias voltage for tube 85, as well as the other tubes of the circuit, is supplied by battery 89 and heater voltage for all the tubes is supplied by battery 90. A negative pulse on the grid of tube 85 decreases the tube current, the anode voltage therefore rising and producing an amplified positive pulse of substantially the same shape as the pulse applied to the grid.

The circuit parameters of amplifier 14 are so chosen that its fall time is shorter than the average spacing between gamma pulses expected to be encountered in the use of the instrument so as to preclude the piling up of gamma pulses at the anode of tube 85. If gamma pulses were permitted to pile up, the effective pulse height produced by gamma rays in the counter would increase, and it would be possible for gamma pulses to attain such a magnitude as to be able to pass the discriminator (to be described in detail) in which case the RBE response of the system would be deteriorated.

Reviewing the counter circuit thus far discussed, methane proportional counter 11 is responsive to both fast neutrons and gamma rays, the counter however, being designed to limit the maximum gamma energy dissipation to 80 kilovolts. Thus, with the counter being proportional, and amplifier 14 substantially linear in operation, pulses proportional in height to the initial total ionization produced by fast neutrons within counter 11, and pulses proportional in height to the ionization produced by gamma rays, up to a maximum of 80 kilovolts, appear at the anode of tube 85. For proper operation of the overall system it is desired that only a portion of the neutron response be used. Accordingly, it is necessary to reject all gamma pulses present in the response and to detect only those neutron-produced pulses which are representative of incident neutrons having an energy in excess of a predetermined value. As was noted earlier, it has been found convenient and suitable to include in the counter response pulses due to neutrons having energies in excess of 250 kilovolts. It will be understood, however, that this is not an exact value, but may vary within rather wide limits and is dictated to a large extent by the chosen parameters of the counter 10, amplifier 14, the subsequent circuitry, and certain biological criteria.

Important considerations in the design of the discriminator are (1) a practical pulse height difference in volts which will allow for easy discrimination, and (2) the stability of the discriminator level. The ratio of neutron to gamma pulse heights must well exceed the normal percentage fluctuation to be expected in the discriminator level. For example, if the pulse height difference is two volts it would be undesirable to operate at levels of 98 and 100 volts because this would require the variation in discriminator level to be maintained within less than 2%. On the other hand, if the operation levels are at 1 and 3 volts, a 20% variation one way or the other will not significantly alter the discriminator operation.

Coarse discrimination, and means for calibrating the circuit to determine whether discrimination is occurring at the proper energy level is provided by the coupling circuit from tube 85 to another amplifier stage 91. Instead of the usual RC coupling circuit, the plate of tube 85 is connected via serially connected condenser 92 and resistor 93 to the control grid of tube 91, and instead of the usual grid resistor, a divider network consisting of resistors 94, 95, and 96 is provided. A switch 97 is connected to short out resistor 94 in position B, or to put resistor 94 in the divider network in position A. When switch 97 is in position A, the signal attenuation is negligible and substantially the entire signal from the plate of tube 85 is applied to the grid, but the resistors 93, 94, 95, and 96 are of such values that when resistor 94 is shorted (by switch 97 in position B) the divider attenuates the signal by a factor of three. Thus, by switching from position B to position A the pulse height to tube 91 can be changed by a factor of three. The discriminator level is set in the laboratory, using a pulser, oscilloscope and associated electronic circuitry, to correspond to a pulse height three times the maximum sized gamma pulses, or approximately 250 kev. With the discriminator set properly, the instrument is exposed to a neutron source, for example, a Po-Be source, and the ratio of the responses of the methane counter with switch 97 in positions A and B noted. The ratio of these two responses is a sensitive function of the discriminator level; therefore, an operator in the field provided with a Po-Be neutron source can adjust the discriminator level to the correct value merely by reproducing this ratio between position A and position B of switch 97.

From what has been said, the signal attenuator and amplifier 91 pass exponential pulses from the counter with their bases clipped off as shown in Fig. 6. The output of amplifier 91 is therefore proportional to the total charge represented by the area of the pulse above the line $E_B$ (representing a level of 0.25 mev.). This is because tube 91 passes a current pulse of the illustrated shape, and this pulse of current can be used to charge the capacitor of a ratemeter. Since the output of a ratemeter is proportional to the charge per pulse, and the charge per pulse is given by $Q = \int i(t)dt$, the output of tube 91 is proportional to the area above the $E_B$ line. The manner in which this charge is detected and indicated will now be described.

The output of the second pulse amplifier 91 is applied to discriminator 15 consisting of a crystal diode 100, such as a 1N91, resistor 101, and potentiometer 102 connected in series between the plate of tube 91 and ground, and a capacitor 103 connected in parallel with the resistors. Quiescently, the current $i_{D_0}$ flows through the diode 100 and the current $i_{T_0}$ flows through tube 91. Assuming diode 100 to be ideal, $$i_{D_0} = \frac{e_{P_0}}{R_{101} + R_{102}}; \quad i_{T_0} = \frac{(B+) - e_{P_0}}{R_{104}} - i_{D_0}$$

If now a positive signal $de_g$ appears at the grid of tube 91, the change in $i_T$ is given by $+g_m de_g$. This extra current, however, does not at first appear as an increase in current through load resistor 104. Instead, the current $i_D$ decreases, the charged capacitor 103 acting like a battery and so providing a low impedance to small current changes. When the current $g_m de_g$ attains the magnitude of $i_{D_0}$, then all of the original diode current is flowing through tube 91 and $i_T$ can only increase by drawing more current through load resistor 104, since diode 100 cannot pass current in the reverse direction. When tube 91 draws current through resistor 104, a negative output pulse, corresponding to the pulse above line $E_B$ in Fig. 6, appears at the plate of tube 91. The bias condition is $g_m d e_g = i_{D0}$, and the discrimination level may, therefore, be changed by adjusting potentiometer 102 which changes $i_{D0}$.

After being clipped by the discriminator circuit, the pulses are integrated to provide a direct current signal in order to be combined with the ion chamber response in D.C. amplifier 12 (Fig. 1). The integrating circuit used in the system (to be described) requires that the output of tube 91 be applied to the grid of another tube. The height of the output pulses from tube 91 may vary anywhere from 0 to 10 volts (depending upon the energy of the neutrons which produced them), but the larger pulses (in excess of 1 volt) are of too large a magnitude to be applied directly to the following grid without driving the tube into a region of non-linearity. The pulse heights must therefore be decreased, but as pure pulse height attenuation would result in the sacrifice of a great deal of the area under the pulses, which two stages of gain were employed to achieve, an RC circuit is used to attenuate, and at the same time to stretch, the pulses so that the energy associated with the pulses will not be changed. This RC circuit includes resistor 106 and capacitor 107, the values of these components being selected so that the pulses are attenuated by a factor of about 10 and also stretched by a factor of 10. Thus, the area under the pulses is retained, and the maximum pulse height applied to the next grid is now of the order of 1 volt, which is well within the linear operating region of the tube. These pulses are coupled to tube 108, which forms a part of the integrating circuit 16 (Fig. 1), via capacitor 109 and resistor 110.

Negative pulses applied to the grid of tube 108, connected as a pulse amplifier, are amplified and then applied via the series combination of potentiometer 111, battery 112, and thermionic diode 113 to an RC tank circuit consisting of resistor 42 and capacitor 114. Tube 108, which may be a 5678, is energized from a suitable source of B+ through a load resistor, a portion 115 of which may be adjustable. Battery 112, which is floating between the plate of tube 108 and the anode of diode 113, is selected to approximate the quiescent plate voltage of tube 108. Potentiometer 115 is then adjusted so that the voltage across diode 113 is just sufficient to cut it off. Under these conditions, the voltage at the plate of diode 113, and the voltage across the tank circuit, $R_{42}C_{114}$ is also zero.

When a negative pulse is applied to the grid of tube 108, a positive pulse, amplified, is developed at the plate and on the plate of diode 113, the positive signal at the diode plate immediately causing conduction through the diode. Assuming the diode to be ideal, and the capacitor 114 to be sufficiently large to completely by-pass resistor 42 for any pulse to be considered, the current flow in the diode is just equal to the reduction of current through tube 108 due to the presence of the pulse. The charge thus deposited on capacitor 114 decays with the time constant $R_{42}C_{114}$, the capacitor being constrained to discharge through resistor 42 only since diode 113 is no longer conducting when the pulse has passed. Thus, the pulses applied to the tank circuit are smoothed out and produce an average voltage at point 115 which increases with the number and energy of the pulses applied thereto and is available for combination with the output of the ion chamber 10.

It will be noted that the integrating circuit $R_{42}C_{114}$ is connected in the feedback loop 55, 56 of D.C. amplifier 12 in such a way as to give signals of the same polarity as the ion chamber signals. The electrometer tube 47 sees the voltage at point 115 as an input voltage to its grid, and will respond accordingly. It will be apparent, then, that meter 13 provides a response which is the sum of the responses of the ion chamber 10 and of proportional counter 11, and from what has been said about these primary detectors, the indication is in rems.

While the foregoing description has been directed to a composite instrument, the two channels, by suitable switching, have separate utility. As will be better understood from a study of Fig. 7, to be described in detail below, the ionization chamber alone will respond in a biologically equivalent manner up to neutron energies of about 0.25 mev., and accordingly, if a radiation flux is known to consist only of neutrons below this energy, and/or gamma radiation, the methane counter is not necessary in order to obtain a r.e.m.-reading indication of the dose. To allow for this alternative use of the instrument, and to facilitate calibration of the instrument, switches are provided in the circuit selectively to connect the two channels to the amplifier 12 and indicating circuit 13. These switches are schematically illustrated at 116 in the methane counter circuit and at 117 in the ion chamber circuit, the actual circuitry in the complete system being somewhat more involved. In normal operation, both switches 116 and 117 are open, the operation being as described above. If only the ion chamber response is desired, switch 116 is closed, shorting the integrating tank, thus preventing counter pulses from building up a signal at point 115. In this condition, the D.C. amplifier 12 is operable as before, the feedback loop being provided through connections 55 and 56 and resistor 42, to indicate the chamber response on meter 13. If only the methane counter response is desired, switch 116 is opened, and switch 117 is closed, thus shorting out the high resistance resistor 41, with the consequence that the ion chamber current does not produce an input signal for the amplifier. Thus, only the signal developed across $R_{42}C_{114}$ is applied to the input circuit of amplifier 12 and meter 13 indicates only the methane counter response.

Fig. 7 of the drawings illustrates the overall response characteristics of the system, and provides a comparison of the instrument response with a so-called "desirable" response curve. In this graph, dosage is plotted on a logarithmic scale in millirems per hour per unit radiation flux per square centimeter per second as a function of the energy of incident neutrons, also plotted on a logarithmic scale in electron volts. Several people have by theoretical methods calculated the dose rate for neutrons as a function of energy, each incorporating his own biological conditions of RBE, critical depth, etc., but none of these workers has adopted the thinking that the higher value of RBE generally associated with ionizing particles of high specific ionization are actually manifested only in the very limited regions of the body in which the "critical organs" lie. The data of these people being the only available at the present time, however, applicants have modified it to incorporate this more recent biological information. Without here repeating the calculations by which it was derived, the cross-hatched area bounded by lines 120 and 121 constitutes what might be considered a "desirable" curve for instruments which are to measure neutron hazard. For neutron energies up to about 10 kev. the dosage is primarily determined by the "critical organs" within the body. At thermal energies, the eyes experience the greatest dose since they are at the surface, and internal organs are not appreciably affected due to the attenuation of the neutrons in the surrounding tissue. As the neutron energies increase towards 10 kev., there is less damage to the eyes because the neutrons are not so strongly thermalized and consequently do not cause ionization, but at the same time much thermalization takes place in the midsection of the body, the resulting thermal neutrons causing damaging ionization within the critical organs within the body. Thus, the dosage to the eyes, generally represented by the upper envelope 120, decreases with increased neutron energy, and dosage to the critical organs within the body, generally represented by the lower envelope increases with increased energy, with the result that the average whole body dose for neutron energies up to about 10 kev. is relatively flat, as shown. At neutron energies above about 10 kev., the eyes, which are at the surface, "see" fast neutrons without attenuation, the resulting proton recoils being more damaging than thermal neutrons, which accounts for the envelope 120 rising rather sharply at this energy. The dose to the midsection also increases because thermalization takes place deeper in the body causing more available thermal neutrons at the critical organs as well as proton recoils. The spread between envelopes 120 and 121, it will be noted, is not constant throughout the energy spectrum, this being due, in part, to ambiguities present in the biological information now available.

In the interest of safety, the parameters of the present instrument have been selected so as to follow, as nearly as possible, the upper envelope 120 of the "desirable" curve, and, in no case, to fall below the lower envelope of the curve. The predicted response curve of the present instrument is defined by the cross-hatched area bounded by lines 122 and 123, which lies within the ambiguity limits of the desired response curve. At thermal energies, the instrument response is derived entirely from the boron coating on the wall of the ionization chamber 10, and in the energy spectrum above about 10 kev., the chamber response is due to detection by the boron coating of thermal neutrons thermalized in the moderating material, and production of protons in the hydrogen fill by fast neutrons. The response of the chamber 10 with moderator (in the region above about 100 kev.) is represented by curves 122' and 123', the prime designation being used because these are actually continuations of curves 122 and 123; i.e., the instrument response curve thus far described is entirely attributable to the ion chamber. It will be noted that the ionization chamber provides a response which is above the lower limit of ambiguity of the "desirable" curve up to neutron energies of about 2 mev., and accordingly, the ion chamber portion of the instrument can be used with reasonable safety for neutrons below this energy.

It is preferable, however, that the overall instrument response more nearly approaches the upper limit 120 of the "desirable" curve to better account for the high RBE's associated with high energy neutrons. The failure of the chamber to meet this requirement is due to the thermalization of some of the neutron flux in the moderating material, and the fact that the hydrogen pressure in the ionization chamber is insufficient to meet the high RBE factor. The methane counter 11 and associated circuitry overcomes this deficiency of the ion chamber by complementing the chamber response in that region of the energy spectrum from about .25 mev. to 10 mev. The methane counter response is indicated by curve 125, starting from zero at about .25 mev. and rising sharply with increased energy. This curve is added to the ionization chamber curve (in D.C. amplifier 12, as described above) to bring the resultant response curve (122, 123) up toward the upper envelope 120 of the "desirable" curve.

From the foregoing discussion, it is seen that applicants have provided a radiation detection system which responds in a biologically equivalent manner to a mixed radiation field composed of neutrons over a wide energy spectrum and/or gamma radiation. The principal response of the system is derived from a specially designed ionization chamber, which response is supplemented by a methane counter for high energy neutrons to account for the high RBE's associated with high energy neutrons. Thus, the RBE factor is built into the electronic system and automatically varies properly over the energy spectrum up to about 10 mev. The components of the instrument are relatively small and light and are readily packaged into a portable device, making it applicable for use in areas where a radiation hazard is suspected.

While there has been described what is now considered to be a preferred embodiment of the invention, it will be apparent to ones skilled in the art that should new concepts and new criteria be adopted for the evaluation of biological damage, the "desirable" curve of Fig. 7 may require adjustment or modification. It can be expected, however, that the shape of the desirable curve would not vary from that illustrated to any great extent, and hence the adjustments described above which set the instrument to follow the present curve can also, within limits, be employed to set the instrument to follow the new curve. It will be obvious to those skilled in the art that various other changes and modifications may be made in the circuitry to allow for possible variations from the illustrated "desirable" curve without departing from the spirit of the invention. For example, it will be appreciated that departures may readily be made from disclosed dimensions and pressures of the ionization chamber and counter without altering the principle of operation, and that many variations are possible in the circuitry of the instrument. It will also be apparent that should future study result in modifications of the curve which exceed the limits of the adjustments described above, the present instrument would still be useable as a dosimeter which displays an interpretable response, although in that case one which would not be biologically equivalent. It is the intention therefore, that the appended claims should cover all such changes and modifications, and conditions of use, as fall within the true spirit and scope of the invention.

What is claimed is:

1. A radiation detection system adapted to respond in a biologically equivalent manner to a mixed radiation flux which may include slow neutrons, fast neutrons and gamma rays comprising, in combination, an ionization chamber formed with means adapted to undergo a neutron alpha reaction in response to an incident thermal neutron flux, means to thermalize fast neutrons below a predetermined energy and containing hydrogen at high pressure and operative to produce a current in response to an incident flux of neutrons and gamma rays, means including a methane-filled radiation counter operative to produce a signal in response to an incident flux of fast neutrons, means for combining the current from said ionization chamber and the signal from said last-mentioned means, and an indicator connected to said combining means.

2. A radiation detection system adapted to respond in a biologically equivalent manner to a mixed radiation flux which may include slow neutrons, fast neutrons and gamma rays comprising, in combination, an ionization chamber containing hydrogen at high pressure and having a coating thereon including a material adapted to undergo a neutron-alpha reaction in response to an incident thermal neutron flux, means to thermalize fast neutrons below a predetermined energy, said ionization chamber being operative to produce an output current in response to an incident flux of neutrons and gamma rays, means including a methane-filled radiation counter operative to produce a voltage in response to an incident flux of fast neutrons, means for combining the current from said chamber and the voltage from said last mentioned means, and an indicator connected to said combining means.

3. A radiation detection system for a mixed radiation flux which may include slow neutrons, fast neutrons and gamma rays comprising, in combination, an ionization chamber containing hydrogen at high pressure and having a coating thereon including a material adapted to undergo a neutron-alpha reaction in response to an incident thermal neutron flux, a covering for said chamber formed of an hydrogenous material to thermalize fast neutrons below a predetermined energy, said chamber with covering being operative to produce an output current in response to an incident flux of gamma rays and neutrons, a methane-filled radiation counter operative to produce pulses of amplitude proportional to the energy of incident fast neutrons and gamma rays, circuit means connected to said counter arranged to discriminate against pulses due to gamma rays incident on the counter and to produce a voltage proportional to the area under that portion of the fast neutron-produced pulses which is in excess of a predetermined amplitude, and means for combining the output current from said ionization chamber with the output voltage from said circuit means.

4. A radiation detection system for slow neutrons, fast neutrons and gamma rays comprising, in combination, an ionization chamber containing hydrogen at high pressure and having a coating thereon including boron adapted to undergo a neutron-alpha reaction in response to an incident thermal neutron flux, a covering for said chamber formed of polystyrene of a thickness to thermalize fast neutrons below a predetermined energy, a thin sheath of high-Z material surrounding said chamber to render said chamber "air-equivalent" to gamma rays, said chamber with covering being operative to produce an output current in response to an incident flux of gamma rays and neutrons, a methane-filled radiation counter operative to produce pulses of amplitude proportional to the energy of incident fast neutrons and gamma rays, circuit means connected to said counter arranged to discriminate against pulses due to gamma rays incident on the counter and to produce a voltage proportional to the area under that portion of the fast neutron-produced pulses which is in excess of a predetermined amplitude, and means for combining the output current from said ionization chamber with the output voltage from said circuit means.

5. A radiation detection system for slow neutrons, fast neutrons and gamma rays comprising, in combination, an ionization chamber containing hydrogen at high pressure and having a coating thereon including boron adapted to undergo a neutron-alpha reaction in response to an incident thermal neutron flux, a covering for said chamber formed of polystyrene of a thickness to thermalize fast neutrons below a predetermined energy, a thin sheath of high-Z material surrounding said chamber to render said chamber "air-equivalent" to gamma rays, said chamber with covering being operative to produce an output current in response to an incident flux of gamma rays and neutrons, a methane-filled radiation counter compartmented to limit the amplitude of pulses produced therein in response to incident gamma rays to a predetermined level while permitting pulses proportional in amplitude to the energy of incident fast neutrons to be produced, circuit means connected to said counter including a discriminator circuit arranged to block pulses produced by incident gamma rays and to pass only that portion of fast neutron-produced pulses which exceed an amplitude representative of a predetermined energy level, means in circuit with said discriminator for integrating the pulses passed thereby to produce a voltage proportional to the area under that portion of the neutron-produced pulses in excess of said predetermined energy level, and circuit means for combining the ionization current from said chamber and the voltage produced in said last-mentioned circuit means.

6. A radiation detection system for slow neutrons, fast neutrons and gamma rays comprising, in combination, an ionization chamber having a metallic elongated cylindrical outer electrode and an inner electrode and containing hydrogen at a pressure of about 10 atmospheres, a coating on the inner surface of said outer electrode including boron adapted to undergo a neutron-alpha reaction in response to an incident thermal neutron flux, a thin sheath of high-Z material surrounding said outer electrode to render said chamber "air equivalent" for gamma rays, a covering of polystyrene surrounding said sheath of a thickness to thermalize fast neutrons below a predetermined energy, said chamber with covering being operative to produce an output current in response to an incident flux of gamma rays and neutrons; a pulse-producing radiation counter having a metallic elongated cylindrical outer electrode and a center wire and containing methane, transverse partitions formed of low-Z material positioned within said outer electrode and dividing the volume thereof into compartments thereby to limit the amplitude of pulses produced therein in response to incident gamma rays to a predetermined level while permitting pulses proportional in amplitude to the energy of incident fast neutrons to be produced, circuit means connected to the center wire of said counter including a discriminator circuit arranged to block pulses produced by incident gamma rays and to pass only that portion of neutron-produced pulses which exceed an amplitude representative of a predetermined energy level, means in circuit with said discriminator for integrating the pulses passed thereby to produce a voltage proportional to the product of the rate of occurrence of the passed pulses and the average area under that portion of the neutron-produced pulses in excess of said predetermined energy level, means including a direct current amplifier for combining the current from said chamber and the voltage produced in said last-mentioned circuit means, and means for selectively applying the current from said chamber and the voltage from said last-mentioned circuit means to said direct current amplifier.

7. A radiation detection system adapted to respond in a biologically equivalent manner to a mixed radiation flux which may include slow neutrons, fast neutrons and gamma rays including an ionization chamber formed with means adapted to undergo a neutron-alpha reaction in response to an incident thermal neutron flux, means to thermalize fast neutrons below a predetermined energy and containing hydrogen at high pressure constructed and arranged to produce an ionization current in response to a flux of neutrons and gamma rays, means including a methane-filled radiation counter operation to produce a signal in response to a flux of incident fast neutrons, and means for combining the current from said ionization chamber and the signal from said last-mentioned means in such proportions that the resulting composite signal is proportional to the biological dose experienced by the body when exposed to the total flux to which said ionization chamber and said counter are exposed.

8. A radiation detection system adapted to respond in a biologically equivalent manner to a mixed radiation flux which may include slow neutrons, fast neutrons and gamma rays including an ionization chamber containing hydrogen at high pressure having means to thermalize fast neutrons below a predetermined energy and having a coating thereon including a material adapted to undergo a neutron-alpha reaction in response to an incident thermal neutron flux for producing an ionization current in response to a flux of neutrons and gamma rays, a methane-filled radiation counter operative to produce pulses of amplitude proportional to the energy of incident fast neutrons and gamma rays, circuit means connected to said counter and operative to produce a voltage in response to pulses in excess of a predetermined amplitude, and means for combining the output current from said ionization chamber with the output voltage from said circuit means in such proportions that the resulting composite signal is proportional to the biological dose experienced by the body when exposed to the total flux to which said ionization chamber and said counter are exposed.

9. A radiation detection system adapted to respond in a biologically equivalent manner to a mixed radiation flux which may include slow neutrons, fast neutrons and gamma rays including an ionization chamber containing hydrogen at high pressure and having a coating thereon including a material adapted to undergo a neutron-alpha reaction in response to an incident thermal neutron flux, a covering for said chamber formed of an hydrogenous material of sufficient thickness to thermalize neutrons below a predetermined energy, said chamber being operative to produce an ionization current in response to a flux of neutrons and gamma rays, a methane-filled radiation counter operative to produce pulses of amplitude proportional to the energy of incident fast neutrons and gamma rays; circuit means connected to said counter and operative to produce a voltage in response to pulses in excess of a predetermined amplitude, and means for combining the output current from said ionization chamber with the voltage from said circuit means in such proportions that the resulting composite signal is proportional to the biological dose experienced by the body when exposed to the total flux to which said ionization chamber and said counter are exposed.

10. A radiation detection system adapted to respond in a biologically equivalent manner to a mixed radiation flux which may include slow neutrons, fast neutrons and gamma rays including an ionization chamber having a metallic cylindrical outer electrode containing hydrogen gas at high pressure and an inner electrode, a coating on the inner surface of said outer electrode containing a material adapted to undergo a neutron-alpha reaction in response to an incident thermal neutron flux, a covering on said chamber formed of polystyrene of sufficient thickness to thermalize fast neutrons below a predetermined energy, and a source of high voltage connected between the electrodes of said chamber, said chamber being operative to produce an ionization current in response to an incident flux of neutrons and gamma rays; a proportional counter having a cylindrical outer electrode containing methane and a center electrode, said counter being compartmented to limit the amplitude of pulses produced therein in response to incident gamma rays to a predetermined level while permitting pulses proportional in amplitude to the energy of incident fast neutrons to be produced; means connected to said counter including a discriminator circuit arranged to block pulses produced by incident gamma rays and to pass only that portion of fast neutron-produced pulses which exceed an amplitude representative of a predetermined energy level, means in circuit with said discriminator for integrating the pulses passed thereby to produce a voltage proportional to the area under that portion of the neutron-produced pulses which exceed said predetermined energy level, and circuit means for adding the voltage produced in said last-mentioned circuit means to the ionization current from said chamber in such proportions that the resulting composite signal is proportional to the biological dose experienced by the body when exposed to the total flux to which said chamber and said counter are exposed.

11. A radiation detection system adapted to respond in a biologically equivalent manner to a mixed radiation flux which may include slow neutrons, fast neutrons and gamma rays comprising, in combination, an ionization chamber having a steel cylindrical outer electrode containing hydrogen gas at high pressure and an inner electrode, a coating on the inner surface of said outer electrode containing a material adapted to undergo a neutron-alpha reaction in response to an incident thermal neutron flux, a thin sheath of high-Z material surrounding said outer electrode to render said chamber "air equivalent" for gamma rays, a covering on said chamber formed of polystyrene of sufficient thickness to thermalize fast neutrons below a predetermined energy, and a source of high voltage connected between the electrodes of said chamber, said chamber being operative to produce an ionization current in response to a flux of neutrons and gamma rays; a proportional counter having a cylindrical outer electrode containing methane and a center electrode, said counter being compartmented to limit the amplitude of pulses produced therein in response to incident gamma rays to a predetermined level while permitting pulses proportional in amplitude to the energy of incident fast neutrons to be produced; means connected to said counter including a discriminator circuit arranged to block pulses produced by incident gamma rays and to pass only that portion of fast neutrons-produced pulses which exceed an amplitude representative of a predetermined energy level, means in circuit with said discriminator for integrating the pulses passed thereby to produce a voltage proportional to the area under that portion of the neutron produced pulses which exceed said predetermined energy level, and circuit means for adding the voltage produced in said last-mentioned circuit means to the ionization current from said ionization chamber in such proportions that the resultant signal is proportional to the biological dose experienced by the body when exposed to the total flux to which said chamber and said counter are exposed.

12. A radiation detection system adapted to respond in a biologically equivalent manner to a mixed radiation flux of slow neutrons, fast neutrons and gamma radiation including an ionization chamber having metallic inner and outer electrodes and containing hydrogen gas at high pressure, means to thermalize fast neutrons below a predetermined energy, a conducting coating on the inner surface of said outer electrode comprising a material adapted to undergo a neutron-alpha reaction in response to incident thermal neutrons with resulting release of alpha particles for causing ionization of the hydrogen within said chamber and resulting production of ionization current at said inner electrode, the high pressure hydrogen in said chamber releasing protons in response to fast neutrons entering the hydrogen with resulting ionization and said hydrogen and production of ionization current at said inner electrode proportional to incident fast neutron flux, said chamber also being responsive to gamma rays by virtue of their interaction with said metallic outer electrode and ejection of electrons therefrom with resulting ionization of said hydrogen and production of ionization current at said inner electrode, a methane-filled counter operative to produce pulses of amplitude proportional to the energy of incident fast neutrons and gamma rays; circuit means connected to said counter and operative to produce a voltage proportional to the rate and energy of incident fast neutrons having energies in excess of a predetermined level, and means for combining the output current from said ionization chamber with the output voltage from said circuit means.

13. A radiation detection system adapted to respond in a biologically equivalent manner to a mixed radiation flux which may include slow neutrons, fast neutrons and gamma rays comprising, in combination, an ionization chamber having a cylindrical steel outer electrode and an inner electrode and containing hydrogen at high pressure, a conductive coating of boron-containing material on the inner surface of said outer conductor, a sheath of high-Z material surrounding said outer conductor of a thickness to render said ionization chamber "air equivalent" for gamma rays, said chamber being covered by an hydrogenous material of sufficient thickness to thermalize fast neutrons below a predetermined energy, said ionization chamber with lead sheath and hydrogenous covering being operative to produce an ionization current in response to a flux of neutron and gamma radiation, a radiation counter filled with methane operative to produce pulses of amplitude proportional to the energy of incident fast neutrons and gamma rays, circuit means connected to said counter and arranged to discriminate against pulses due to gamma rays incident on the counter and to produce a voltage proportional to the area under that portion of the fast neutron-produced pulses which is in excess of a predetermined amplitude, and means for combining the output current from said ionization chamber with the voltage produced by said circuit means in such proportions that the resultant signal is proportional to the biological dose experienced by the body when exposed to the total flux to which said chamber and said counter are exposed.

14. A radiation detection system adapted to respond in a biologically equivalent manner to a mixed radiation flux which may include slow neutrons, fast neutrons and gamma rays comprising, in combination, an ionization chamber having a steel cylindrical outer electrode containing hydrogen gas at about 10 atmospheres pressure and an inner electrode, a coating on the inner surface of said outer electrode including boron adapted to undergo a neutron-alpha reaction in response to an incident thermal neutron flux with resulting release of alpha particles for causing ionization of said hydrogen and resulting production of an ionization current, a sheath of lead surrounding said outer electrode of sufficient thickness to render said chamber "air equivalent" for incident gamma rays, a covering on said chamber formed of polystyrene of sufficient thickness to thermalize incident fast neutrons having energies below a predetermined level, and a source of high voltage connected between the electrodes of said chamber, said chamber being operated to produce an ionization current in response to an incident flux of thermal and fast neutrons and gamma rays; a proportional counter having an elongated cylindrical outer electrode containing methane and a center electrode, a lining on the inner surface of said outer electrode formed of low-Z material, a plurality of spaced transverse partitions formed of low-Z material positioned with said counter for limiting the amplitude of pulses produced therein in response to incident gamma rays to a predetermined level while allowing pulses proportional in amplitude to the energy of incident fast neutrons to be produced; means connected to said counter including a discriminator circuit biased to pass only that portion of the pulses produced in said counter which exceed an amplitude representative of a predetermined neutron energy, means in circuit with said discriminator for integrating the pulses passed by said discriminator to produce a voltage proportional to the area under that portion of the fast neutron-produced pulses which is in excess of said amplitude; and circuit means connected to said last-mentioned means and to said ionization chamber for adding the output signals therefrom in such proportions that the resultant signal is proportional to the biological dose experienced by the body when exposed to the total flux to which said chamber and said counter are exposed.

15. A radiation detection system adapted to respond in a biologically equivalent manner to a mixed radiation flux which may include slow neutrons, fast neutrons and gamma rays comprising, in combination, an ionization chamber having a steel cylindrical outer electrode containing hydrogen gas at about 10 atmospheres pressure and an inner electrode, a coating on the inner surface of said outer electrode including boron adapted to undergo a neutron-alpha reaction in response to an incident thermal neutron flux with resulting release of alpha particles for causing ionization of said hydrogen and resulting production of an ionization current, a sheath of lead surrounding said outer electrode of sufficient thickness to render said chamber "air equivalent" for incident gamma rays, a covering on said chamber formed of polystyrene of sufficient thickness to thermalize incident fast neutrons having energies below a predetermined level, and a source of high voltage connected between the electrodes of said chamber, said chamber being operative to produce an ionization current in response to an incident flux of thermal and fast neutrons and gamma rays; a proportional counter having an elongated cylindrical outer electrode containing methane and a center electrode, a lining on the inner surface of said outer electrode formed of aluminum, a plurality of spaced transverse partitions formed of aluminum positioned within said counter for limiting the amplitude of pulses produced therein in response to incident gamma rays to a predetermined level while allowing pulses proportional in amplitude to the energy of incident fast neutrons to be produced; means connected to said counter including a discriminator circuit biased to pass only that portion of the pulses produced in said counter which exceed an amplitude representative of a predetermined neutron energy, and means in circuit with said discriminator for integrating the pulses passed by said discriminator to produce a voltage proportional to the area under that portion of the fast neutron-produced pulses which is in excess of said amplitude; a direct current amplifier having a high resistance input circuit and an output circuit, separate means coupling the inner electrode of said ionization chamber and said integrating means to said input circuit whereby the signals from said ionization chamber and said integrating means are added in said amplifier, and a meter connected in the output circuit of said amplifier.

16. A radiation detection system adapted to respond in a biologically equivalent manner to a mixed radiation flux which may include slow neutrons, fast neutrons and gamma rays comprising, in combination, an ionization chamber having a steel cylindrical outer electrode containing hydrogen gas at about 10 atmospheres pressure and an inner electrode, a coating on the inner surface of said outer electrode including boron adapted to undergo a neutron-alpha reaction in response to an incident thermal neutron flux with resulting release of alpha particles for causing ionization of said hydrogen and resulting production of an ionization current, a sheath of lead surrounding said outer electrode of sufficient thickness to render said chamber "air equivalent" for incident gamma rays, a covering on said chamber formed of polystyrene of sufficient thickness to thermalize incident fast neutrons having energies below about 10 kev., and a source of high voltage connected between the electrodes of said chamber, said chamber being operative to produce an ionization current in response to an incident flux of thermal and fast neutrons and gamma rays; a proportional counter having an elongated cylindrical outer electrode containing methane and a center electrode, a lining on the inner surface of said outer electrode formed of aluminum, a plurality of spaced transverse partitions formed of aluminum positioned within said counter for limiting the amplitude of pulses produced therein in response to incident gamma rays to a predetermined level while allowing pulses proportional in amplitude to the energy of incident fast neutrons to be produced; means connected to said counter including a discriminator circuit biased to pass only that portion of the pulses produced in said counter which exceed an amplitude representative of a neutron energies of about 250 kilovolts, a pulse-stretching circuit connected to said discriminator for reducing the amplitude and increasing the duration of the pulses passed by said discriminator so as to preserve the energy content of said pulses at the value they possess upon leaving said discriminator, an integrating circuit connected to said pulse-stretching circuit for integrating said pulses to produce a voltage proportional to the product of the rate of occurrence of the pulses passing said discriminator and the average area under that portion of the neutron-produced pulses in excess of about 250 kilovolts, a direct current amplifier having a high resistance input resistor and an output circuit, a connection from the inner electrode of said ionization chamber to one end of said resistor, a connection from said integrating circuit to the other end of said resistor, and a meter connected in the output circuit of said amplifier.

17. A radiation detection system adapted to respond in a biologically equivalent manner to a mixed radiation flux which may include slow neutrons, fast neutrons, and gamma radiation comprising, an ionization chamber having metallic inner and outer electrodes and containing hydrogen gas at high pressure, a conducting coating on the inner surface of said outer electrode comprising a material adapted to undergo a neutron-alpha reaction in response to incident thermal neutrons with resulting release of alpha particles for causing ionization of the hydrogen within said chamber and resulting production of ionization current at said inner electrode, the high pressure hydrogen in said chamber releasing protons in response to fast neutrons entering the hydrogen with resulting ionization of said hydrogen and production of ionization current at said inner electrode proportional to incident fast neutron flux, said chamber also being responsive to gamma rays by virtue of their interaction with said metallic counter electrode and ejection of electrons therefrom with resulting ionization of said hydrogen and production of ionization current at said inner electrode, and a covering for said chamber formed of a hydrogenous material of sufficient thickness to thermalize neutrons below a predetermined energy.

References Cited in the file of this patent

UNITED STATES PATENTS

| | | |
|---|---|---|
| 2,437,476 | Parker | Mar. 9, 1948 |
| 2,440,167 | Broxon et al. | Apr. 20, 1948 |
| 2,462,471 | Crumrine | Feb. 22, 1949 |
| 2,481,964 | Wollan | Sept. 12, 1949 |
| 2,491,220 | Segre et al. | Dec. 13, 1949 |
| 2,499,311 | Herzog et al. | Feb. 28, 1950 |
| 2,556,768 | McKibben | June 12, 1951 |
| 2,761,071 | Hurst | Aug. 28, 1956 |